United States Patent [19]

Ushio et al.

[11] Patent Number: 4,472,736
[45] Date of Patent: Sep. 18, 1984

[54] LITHOGRAPHIC REPRODUCTION ORIGINAL CLASSIFICATION AND COLOR SEPARATION TONE CURVE ADJUSTMENT

[75] Inventors: Hideki Ushio, Kamifukuoka; Hisao Akiguchi, Tokyo; Shigeru Kassu, Urawa; Renji Otake, Kawasaki, all of Japan

[73] Assignee: Dainippon Ink and Chemicals Incorporated, Tokyo, Japan

[21] Appl. No.: 278,460

[22] Filed: Jun. 29, 1981

[30] Foreign Application Priority Data

Mar. 11, 1980 [JP] Japan .................................. 55-29765
Jul. 2, 1980 [JP] Japan .................................. 55-89089

[51] Int. Cl.³ .............................................. H04N 1/46
[52] U.S. Cl. ........................................ 358/75; 430/30; 382/50; 382/18; 364/526; 358/280; 358/80
[58] Field of Search .................... 382/18, 50; 364/526; 358/75, 80; 101/DIG. 24–DIG. 26, 365, 211; 430/30; 355/38

[56] References Cited

U.S. PATENT DOCUMENTS

| | | | |
|---|---|---|---|
| 3,663,110 | 5/1972 | Rising | 355/38 X |
| 4,261,011 | 4/1981 | Knop | 358/75 |
| 4,285,009 | 8/1981 | Klopsch | 358/80 X |
| 4,309,496 | 1/1982 | Miller | 101/211 X |
| 4,328,515 | 5/1982 | Wellendorf | 358/80 |
| 4,335,398 | 6/1982 | Yamada | 358/80 |
| 4,350,996 | 9/1982 | Rosenfeld | 358/75 |
| 4,396,940 | 8/1983 | Tanaka et al. | 358/80 |
| 4,410,909 | 10/1983 | Ueda et al. | 358/80 X |

FOREIGN PATENT DOCUMENTS 2944332 5/1981 Fed. Rep. of Germany ... 101/DIG. 26
2024457 1/1980 United Kingdom ................ 101/365

OTHER PUBLICATIONS

Chung, R., "A Statistical Method for Image Classification and Tone Reproduction Determination", *Journal of Applied Photographic Engineering*, 3:74–81, (1977).

Primary Examiner—Gareth D. Shaw
Assistant Examiner—Ronni S. Malamud
Attorney, Agent, or Firm—Robert E. Burns; Emmanuel J. Lobato; Bruce L. Adams

[57] ABSTRACT

An original to be lithographically reproduced is classified according to density distribution into one of a plurality of classes established on the basis of various high quality standard printed reproductions by comparing the density distribution patterns of the original and the standard reproductions. The patterns indicate relative frequency of density values in the entire density range. After being classified, the original is reproduced utilizing a standard color separation tone curve for a scanner that corresponds to the compared and selected standard reproduction. Alternatively a reference tone curve based on a grey scale may be used with a correction according to the difference between the reference tone curve and the standard tone curve. Also the reference tone curve may be corrected with the difference between the original density distribution pattern and the selected standard density distribution pattern.

An apparatus for use in the processes is also disclosed.

11 Claims, 18 Drawing Figures

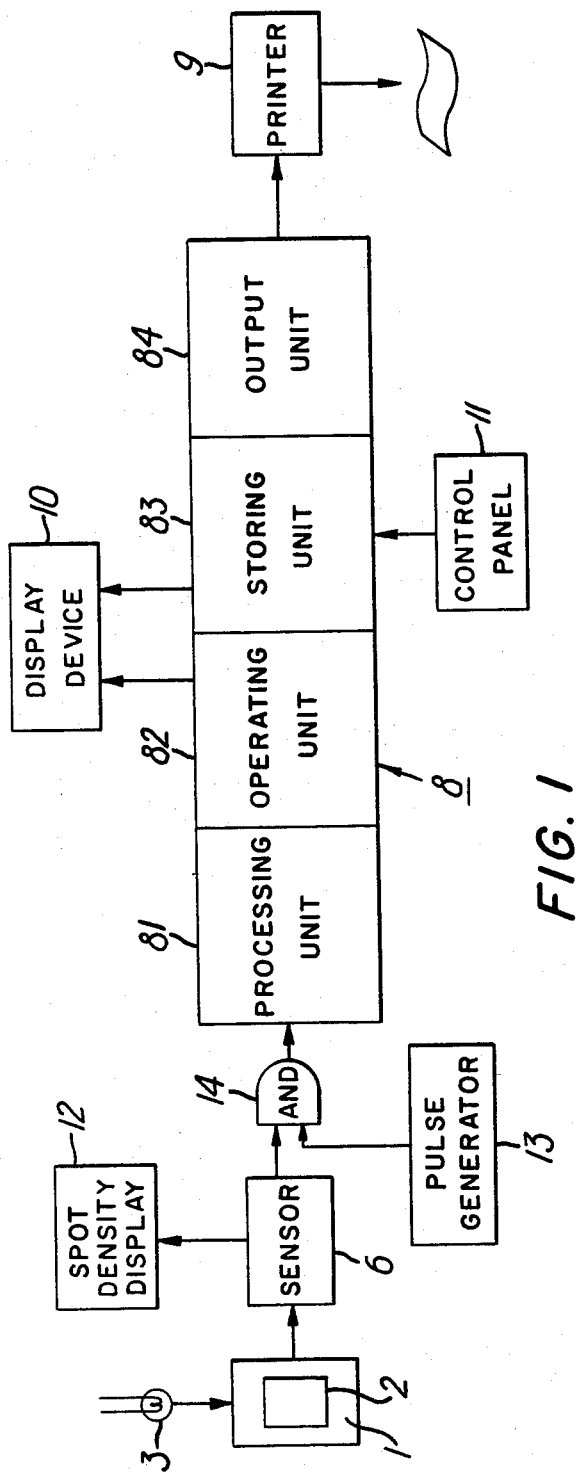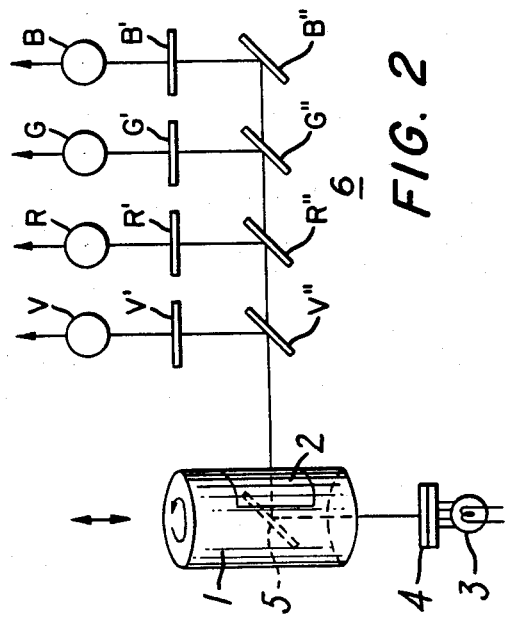

LITHOGRAPHIC REPRODUCTION ORIGINAL CLASSIFICATION AND COLOR SEPARATION TONE CURVE ADJUSTMENT

BACKGROUND OF THE INVENTION

1. Field of the Invention

This invention relates to processes for and apparatuses for use in classifying an original to be reproduced in lithography according to its density distribution. The invention also relates to processes for and apparatuses for use in adjusting a setting up a color separation tone curve for an electronic color separator for reproducing in lithography a color original in a desired tone.

2. Description of the Prior Art

When a color reproduction is to be produced from a color original including transparent and reflection copies, the original must be color separated to form typically four negatives or positives each corresponding to the respective separated colors of the original. Electronic color separators or scanners are widely used to separate the colors of the original. The scanner scans an original which may be a transparency or a reflection copy to measure the density of the original and separate the colors of the original as well as to effect desired modification of the reproduction such as masking, various color corrections, etc. by means of electronic circuitry. Although the scanner is useful in significantly reducing the length of the color separation operation and in producing reproductions of excellent quality, it entails several problems that need to be solved.

One of the problems is derived from the fact that each original has its own particular color characteristics and density characteristics. A desired color separation negative or positive cannot be obtained by simply adjusting an original on a scanner and pushing the start button. This is because the color materials of the original and the reproduction are different in color characteristics, and particularly because their density ranges differ. Typically, the color materials of color film originals and reflective originals have a wider density range and printing inks including a coloring agent have a narrower density range. Therefore, when a color separated negative is to be prepared from a color film original, the density range of the negative must be trimmed. Also, in lithography, color density is expressed by the size of the printing dots, but the density of the original is not directly proportional to the size of the screen dots. Therefore, in order to reproduce the desired tone of the original in a reproduction, the tone of highlight regions as well as the tone of shadow regions of the reproduction must be precisely controlled in addition to proper adjustment of the tone of middle tone regions.

According to the current practice, the respective densities of the highlights, shadows and halftones are individually measured by means of a densitometer, and on the basis of the measured data and the personal knowledge and skill of an experienced scanner operator, the control knobs of the scanner are adjusted so that an optimum desired reproduction is obtained by selecting the density range of the separated film and the separation tone curve. However, such adjustment of the color separation tone curve of the scanner must be achieved by a large number of control knobs on the scanner, requiring skill and time.

In order to save man hours and the cost of the color separation, an experienced, skilled color retoucher closely observes the color original and classifies it on the basis of personal experience, according to its density distribution. Then the scanner is adjusted according to this classification. Even with such adjustment of the scanner, only about forty percent of the resulting reproductions are satisfactory for use. When the reproduction is not satisfactory, the scanner must be readjusted and another separation film must be produced. Therefore it is desirable to provide a simple, objective and efficient technique for classifying an original according to density distribution. It is furthermore desirable to provide a simple and efficient technique for adjusting a scanner.

SUMMARY OF THE INVENTION

Accordingly, an object of the present invention is to provide a process for objectively classifying an original for use in reproduction according to its density distribution.

Another object of the present invention is to provide an apparatus for use in objectively classifying an original for the lithographical reproduction.

Still another object of the present invention is to provide a process for adjusting a color separation tone curve for an electronic color separator lithographically reproducing a color original in a desired tone.

Still a further object of the present invention is to provide an apparatus for use in adjusting a color separation tone curve for an electronic color separator.

The original classifying process of the present invention comprises the steps of preparing a plurality of standard density distribution "patterns" indicating relative frequency of density values by measuring the density distribution of "standard" reproductions which are selected from a large number of quality reproductions. These standard patterns are stored. Then a density distribution pattern of an original to be classified is generated by measuring its density distribution and patternizing the measured density distribution. The density distribution pattern of the original can then be compared with the density distribution patterns of the standard reproductions that are stored, thereby selecting by general observation one of the standard density distribution patterns that is closest to the original density distribution pattern to determine that the original belongs to a class of the standard reproduction that includes the selected density distribution pattern.

The apparatus for use in classifying an original according to its density distribution comprises density measuring means for measuring the density of the original and generating a plurality of density signals. A storing and sorting means is provided for storing and sorting the density signals in accordance with their density values into a plurality of groups corresponding to a plurality of density range sections. The number of the density signals is counted by a counting means for each of the density range sections to generate a density distribution. A pattern producing means produces a density distribution pattern indicating a relative density frequency from the density distribution and the produced pattern can be stored in a storing means. The stored density distribution pattern can be outputted when desired by means of an outputting means for comparison purposes.

The process of adjusting a color separation tone curve of the present invention comprises the steps of selecting a plurality of high quality reproductions each differing from each other in tone, from a large number of reproductions. The selected standard reproductions are measured as to their density distribution and a cumulative density distribution is obtained for each of the high quality reproductions. Set values of a color separation tone curve for the scanner are obtained, which set values correspond to the reproduction or standard density distribution patterns. A cumulative density distribution of the original is produced and an original cumulative density distribution pattern is obtained. This pattern indicates at least the relative cumulative frequency of the density values with respect to the entire density range of the original. This density distribution pattern is then standardized so that the pattern is directly comparable with the standard density distribution patterns. By means of comparison, one of the standard density distribution patterns that is closest to the original's standardized density distribution pattern is selected. The color separation tone curve of the scanner can now be set up by the stored set values that correspond to the selected standard density distribution pattern.

BRIEF DESCRIPTION OF THE DRAWINGS

The present invention will become more readily apparent from the following description of the preferred embodiments taken in conjunction with the accompanying drawings in which:

FIG. 1 is a block diagram showing the functions of the apparatus according to the present invention, which apparatus is useful both in the classification of an original and in the adjusting of the color separation tone curve for a scanner;

FIG. 2 is a schematic view of the density measuring part of the apparatus of the present invention shown in FIG. 1;

DETAILED DESCRIPTION OF THE PREFERRED EMBODIMENTS

Figure 3A:
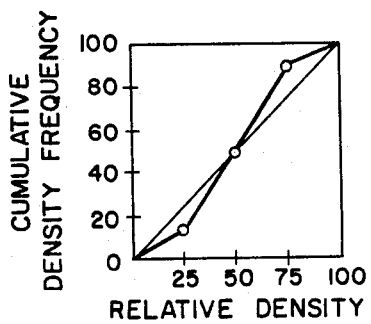
FIGS. 3a to 3j are examples of the standard density distribution pattern.

The apparatus according to the present invention as schematically shown in FIGS. 1 and 2 comprises a mounting cylinder 1 on which an original 2 to be classified is mounted. In the illustrated exemplary apparatus, the mounting cylinder 1 is a hollow cylinder with a window formed on its cylindrical wall. The cylinder 1 is rotatable about and movable along its longitudinal axis by a suitable known drive mechanism (not shown). The original 2 to be classified is placed over the window and illuminated from the inside of the mounting cylinder 1 by a suitable light source 3 via a lens system 4 and a mirror 5, so that the light passed through the transparent original 2 reaches a sensor 6.

When the original is of the reflective type such as a photo print, the light source 3 and the optical system therefor are disposed outside the mounting cylinder 1 so that the original is illuminated on its face and scattered light reaches the sensor 6 of the apparatus.

Where the transmitted light passed through the transparent original 2 is to be measured as visual light, the light is transmitted through a total reflective mirror V" and a visual filter V' to a photomultiplier V of the sensor 6. With the visual measurement, the density of the color original is represented by a single set of original signals. Where the densities of the separated colors red, green and blue of the original are to be respectively measured, the mirror V" is retracted from the light path so that the transmitted light is supplied to the half mirrors R", G" and B" of the sensor 6. The light partly reflected from the half mirror R" passes through a filter R' and is detected by a photomultiplier R. Similarly other color components reflected from the half mirrors G" and B" are measured by photomultipliers G and B after they pass through the respective filters G' and B'.

The light from the original 2 is converted into an electric signal representing the density of the original 2 by the photomultiplier V or the photomultipliers R, G and B. The signals from the photomultipliers are supplied to a microcomputer 8 having various processing, operating, storing and outputting units 81, 82, 83 and 84, respectively.

The electric signal representative of the density value is first supplied to the processing unit 81 of the computer 8, where the input signal is sorted by an unillustrated separator or sorter into a plurality of groups according to a plurality of density range sections which are sections of the entire density range of the original. The sorted signals are counted in number by counters each for the respective original range sections. The counters are self-held until an input signal indicating that the density measurement of the entire original has been completed. At this time the density distribution measurement of the original has been completed.

The scanning of the original may be accomplished by various suitable ways. For example, the mounting cylinder 1 may be incrementally moved in the axial direction by a predetermined pitch for each one complete rotation thereof while the light source and the light sensors are held stationary. Alternatively, the mounting cylinder 1 may make rotations only while the optical mirror and the light receiving portion of the sensor are synchronously moved along the longitudinal axis of the mounting cylinder so that the mounted original is scanned. In order to effect plot measurement of the density of the original, the analogue electric signal from the photomultiplier and a series of sampling pulses at a predetermined frequency are connected to an AND circuit to obtain output pulses indicative of the density values of the original.

The density signals indicative of the density distribution thus obtained by the processing unit 81 are supplied to the operating unit 82 of the computer 8, wherein a computation is effected as to what percentage the density portions that fall within the respective density range sections occupy with respect to the total density portions of the entire original, or density distribution values of the density range sections are calculated in the order of the density values, obtaining deviation values and integrating the deviation values, thereby to obtain a cumulative density distribution, from which a percentage of cumulative density frequency for each of the density range sections or a relative ratio of the density range sections is obtained. Obtaining the percentage or the relative ratio as just above explained will hereinafter be referred to as "patternization" or the generation of a "pattern". The signals thus "patternized" are stored within a storing unit 83 of the computer 8.

The stored patterns may be displayed on a CRT monitor as curves or numerals.

There are several ways for classifying the original according to its difference in the density distribution. For example, some of the standard patterns may be displayed on the screen of the CRT display 10 device and the measured density distribution pattern of the original may also be displayed on the same screen in order that the operator may compare and determine which standard pattern is the closest to the original density distribution pattern by general observation and comparison of the patterns. When the closest standard density distribution pattern has been determined, it means that the original to be reproduced falls in the class of the density distribution within which the standard reproduction that has the corresponding density distribution pattern belongs.

Alternatively, the density distribution pattern of the measured original may be displayed on the CRT monitor and a plurality of original density distribution patterns may be successively displayed on the monitor in overlapping relationship with respect to the displayed original pattern, thereby to compare them and classify the original according to its density distribution.

When desired, the output unit 84 of the computer may drive the printer 9 to print out the density distribution patterns in the form of graphs, numerals, characters, etc.

The present invention has been made based on the fact that a wide range of originals can be classified according to their density distribution into only a small number of classes or types, and that the printed reproductions can also be similarly classified. It has been found that practically all printed reproductions can be classified into about ten classes. FIGS. 3a to 3j show the density distribution pattern for each class in the form of cumulative density distribution curves, the abscissa representing the relative density in percent terms and the ordinate representing the cumulative density frequency in percent.

According to the process for classifying an original according to its density distribution according to the present invention, the process comprises the following steps:

(a) measuring density distributions of a plurality of standard or selected reproductions each of which are of high quality but different from each other in terms of their tone;

(b) processing each of the measured density distributions to generate and store one standard density distribution pattern for each measured density distribution, said pattern indicating the relative frequency of density values with respect to the entire density range of the standard reproduction;

(c) measuring the density distribution of the original to be classified;

(d) generating an original density distribution pattern from the measured density distribution of the original, said original density distribution pattern indicating relative frequency of density values with respect to the entire density range of the original; and (e) comparing said original density distribution pattern with each of said standard density distribution patterns to select one of said standard density distribution patterns that is closest to the original density distribution pattern, thereby to determine that the original belongs to a class of the standard reproduction corresponding to the selected standard density distribution pattern.

By the classifying process of the present invention, an original to be reproduced in lithography can be objectively and quickly classified according to the density distribution of the original.

According to the process for setting up a color separation tone curve for a scanner of the present invention, a separation curve set-up can be objectively, quickly and easily achieved with high accuracy, ensuring that a desired tone or density distribution is reproduced. The first color separation tone curve setting up process of the present invention comprises the following steps:

(a) selecting a plurality of standard reproductions each of which are of high quality but different from each other in terms of their tone;

(b) measuring density distributions of said standard reproductions and producing cumulative density distributions of said standard reproductions;

(c) processing each of the cumulative density distributions to generate a standard cumulative density distribution pattern for each density distribution, said density pattern indicating the relative cumulative frequency of density values with respect to the entire density range of each of the standard reproductions;

(d) obtaining and storing set values of a color separation tone curve for the electronic color separator, said values corresponding to said standard density distribution patterns;

(e) measuring the density of an original to be color separated and producing a cumulative density distribution of the original;

(f) processing the cumulative density distribution of the original to generate an original cumulative density distribution pattern, said density pattern indicating the relative cumulative frequency of density values with respect to the entire density range of the original;

(g) generating a standardized density distribution pattern of the original from said cumulative density distribution of the original, said standardized density distribution pattern being directly comparable with said standard density distribution pattern;

(h) comparing said standardized original density distribution pattern with each of said standard density distribution patterns to select one of said standard density distribution patterns that is closest to the original standardized density distribution pattern; and (i) adjusting the color separation tone curve for the electronic color separator on the basis of the stored set values that correspond to the selected standard density distribution pattern.

The second process of adjusting a color separation tone curve for an electronic color separator for lithographically reproducing a color original in a desired tone comprises the steps of:

(a) selecting a plurality of standard reproductions each of which are of a high quality but different from each other in terms of their tone;

(b) measuring the density distributions of said standard reproductions and producing cumulative density distributions of said standard reproductions;

(c) processing each of the cumulative density distributions to generate a standard cumulative density distribution pattern for each of the density distributions, said density distribution pattern indicating the relative cumulative frequency of the density values with respect to the entire density range of each of the standard reproductions;

(d) measuring the density of an original to be processed and producing a cumulative density distribution of the original;

(e) processing the cumulative density distribution of the original to generate an original cumulative density distribution pattern, said density pattern indicating relative cumulative frequency of the density values with respect to the entire density range of the original;

(f) generating a standardized density distribution pattern of the original from said cumulative density distribution of the original, said standardized density distribution pattern being directly comparable with said standard density distribution pattern;

(g) comparing said original standardized density distribution pattern with each of said standard density distribution patterns to select one of said standard density distribution patterns that is closest to the original standardized density distribution pattern;

(h) adjusting a standard color separation tone curve for reproducing the original into the tone of the selected standard reproduction from the original standardized density distribution pattern and the selected standard density distribution pattern;

(i) adjusting a color separation tone curve of the electronic color separator into a reference color separation tone curve for a grey scale;

(j) comparing said standard color separation tone curve with said reference color separation tone curve to determine a difference therebetween; and (k) modifying said reference color separation tone curve according to said difference between said standard tone curve and said reference tone curve.

The third process for adjusting a color separation tone curve for an electronic color separator for lithographically reproducing a color original in a desired tone comprises the steps of:

(a) selecting a plurality of standard reproductions each of which are of a high quality but different from each other in terms of their tone;

(b) measuring the density distribution of said standard reproductions and producing cumulative density distributions of said standard reproductions;

(c) processing each of the cumulative density distributions to generate a standard cumulative density distribution pattern for each of the density distributions, said density distribution pattern indicating the relative cumulative frequency of the density values with respect to the entire density range of each of the standard reproductions;

(d) measuring the density of an original to be processed and producing a cumulative density distribution of the original;

(e) processing the cumulative density distribution of the original to generate an original cumulative density distribution pattern, said density pattern indicating the relative cumulative frequency of the density values with respect to the entire density range of the original;

(f) generating a standardized density distribution pattern of the original from said cumulative density distribution of the original, said standardized density distribution pattern being directly comparable with said standard density distribution pattern;

(g) comparing said original standardized density distribution pattern with each of said standard density distribution patterns to select one of said standard density distribution patterns that is closest to the original standardized density distribution pattern;

(h) comparing said selected standard density distribution pattern with said original standardized density distribution pattern to determine a difference therebetween;

(i) adjusting a color separation tone curve of the electronic color separator into a reference color separation tone curve for reproducing a grey scale; and (j) modifying said reference color separation tone curve according to said difference between the selected standard density distribution pattern and the original standardized density distribution pattern.

The plurality of standard reproductions should be selected from a large number of high quality reproductions of a wide variety of tones or density distributions. These standard reproductions preferably include typical subjects and typical tones and are classified into groups according to their density distribution patterns. Although the selection of such standard reproductions must be carried out with substantial time and care, the selected standard reproductions and the standard density distribution patterns once obtained therefrom can be used repeatedly unless there are special unusual conditions, so that the operation of selection does not detract from the advantages of the present invention. As evident from the foregoing, the term "standard reproduction" as used throughout the specification and claims refers to a typical or representative reproduction which is used as a standard for comparing and judging other reproductions.

Figure 3B:
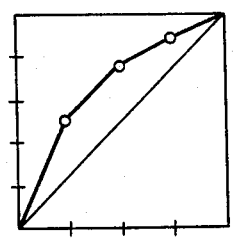
Figure 3C:
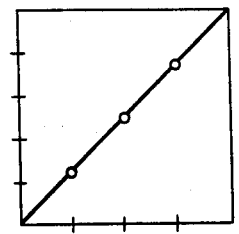
Figure 3D:
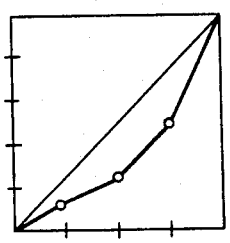
Figure 3E:
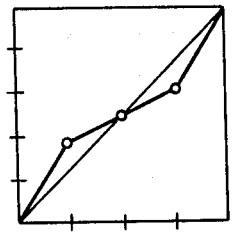
Figure 3F:
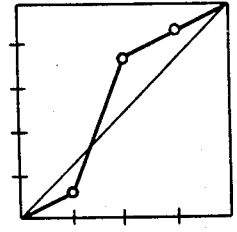
Figure 3G:
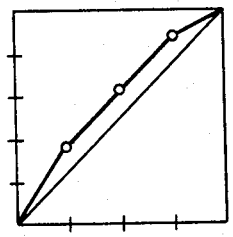
Figure 3H:
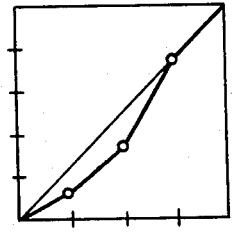
Figure 3I:
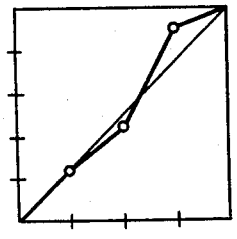
Figure 3J:
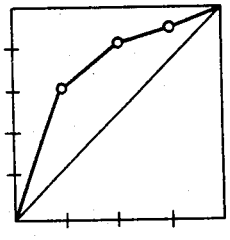

In FIGS. 3a to 3j, the density distribution frequency is integrated at each 25% relative density plot point to obtain density distribution patterns. Of course, the number of plot points may be increased to obtain a more precise density distribution pattern. From these density distribution patterns, it is known that the corresponding printed reproductions have the tone or density distribution as set forth below:

FIG. 3a: many halftone areas
FIG. 3b: many highlight areas
FIG. 3c: equal highlight and shadow
FIG. 3d: dominant areas of shadow
FIG. 3e: highlight and shadow from the main part
FIG. 3f: halftones dominate over highlights
FIG. 3g: substantially equal areas of highlight and shadow but brighter than FIG. 3c overall
FIG. 3h: dominated by areas from halftones to shadows
FIG. 3i: dominated by areas from halftones to shadows but generally brighter than FIG. 3h
FIG. 3j: dominated by areas of highlight the brightes overall Before comparing the density distribution pattern obtained by automatically measuring the cumulative density distribution of an original to be reproduced, with the standard density distribution patterns of the printed reproductions, pre-treatment is neccessary, for the following reasons.

While the density range of a printed reproduction is usually 2.4 in density, the density range of a color film colored by coloring substances is usually 3.4 in density which is significantly wider than the former. Thus, it is not possible to compare original patterns and standard patterns which are different in terms of their density range. Therefore according to the present invention, a special step is provided for formulating a "standardized" original density distribution pattern that is comparable with the standard density distribution patterns obtained from the selected standard printed reproductions. This step is herein referred to as "standardization" of the patterns.

Figure 4:
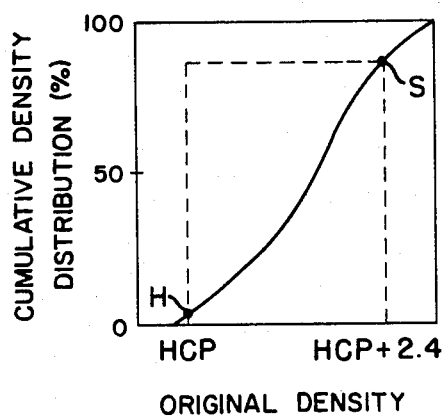
FIGS. 4 to 7 are curves useful in explaining the "standardization" function of the present invention.
Figure 5:
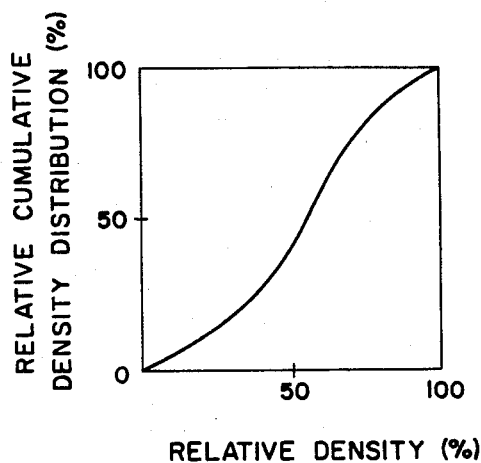

For example, when the cumulative density distribution of an original is as shown in FIG. 4, and when the density of the highlight (highest color point) is H, the density range up to point S which is obtained by the addition of the density 2.4 to the density at the point H is deemed to be the density range of the original to be reproduced. The density range thus obtained is revised so that a new density distribution pattern as shown in FIG. 5 is obtained, in which the abscissa represents the relative density in percent and the ordinate represents the cumulative density distribution in percent. Thus, the curve shown in FIG. 5 is an example of a "standardized" density distribution pattern of the original to be reproduced having a density distribution pattern shown in FIG. 4.

Figure 6:
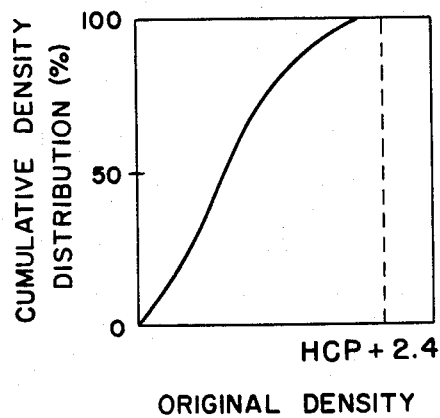
Figure 7:
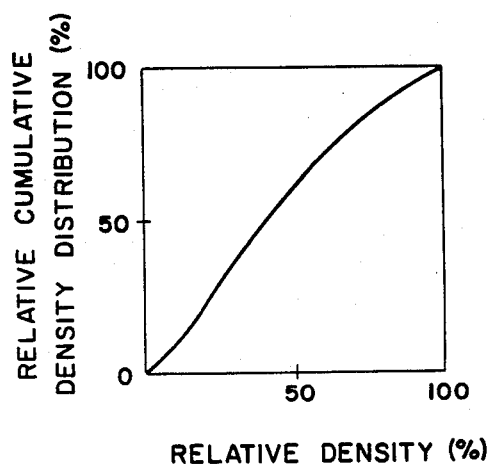

FIG. 6 shows another example of a density distribution pattern before "standardization" and FIG. 7 shows a density distribution pattern after "standardization" from the pattern shown in FIG. 6.

The procedure for the "standardization" may be easily achieved by the use of a computer.

Once the density distribution pattern of an original to be reproduced is thus "standardized", it can then be used, in relation to the standard density distribution pattern, to obtain a color separation tone curve for a scanner in accordance with the three processes previously mentioned.

In order to reproduce an original in the form of printed matter having a tone as represented by one of the standard density distribution patterns shown in FIGS. 3a to 3j, the adjustment values of the scanner are first obtained on the basis of experience by various measurements and actual practice. Then the density distribution pattern of an original to be reproduced is generated and compared with the standard density distribution pattern to select by general observation the density distribution pattern that is closest to the original density distribution pattern. Then the color separation tone curve can be set up according to the adjustment values of the color separation tone curve corresponding to the selected standard density distribution pattern. Alternatively, the density distribution pattern of the original may be modified in consideration of tone modifying instructions attached to the original, and the modified original pattern may be compared with the standard density distribution patterns to select the closest standard pattern. The color separation tone curve for the scanner can then be adjusted in a manner similar to that just above described.

Figure 8:
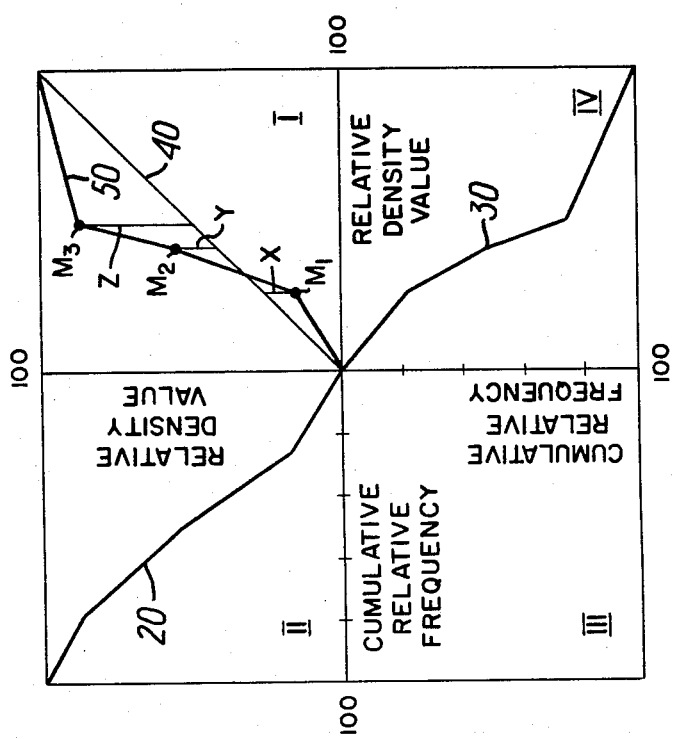
FIG. 8 is a graph for explaining the mathematical process for obtaining the color separation tone curve from the standard density distribution pattern and the original density distribution pattern.

Another process utilizes a grey scale to obtain a desired color separation tone curve for a scanner. Firstly, the color separation curve of the scanner is adjusted so that a grey scale is reproduced which has the same density distribution as the transparent grey scale used. Such color separation curve of the scanner will herein be referred to as the "reference" color separation tone curve. Then, from the original density distribution pattern and the selected standard density distribution pattern, a color separation tone curve for the scanner for reproducing the original in a tone corresponding to the selected standard printed material can be obtained by a four quadrant diagram as shown in FIG. 8. In the Figure, a curve 20 in the second quadrant II represents one of the standard patterns or the cumulative density frequencies of a printed reproduction selected from a plurality of standard reproductions, a curve 30 in the fourth quadrant IV represents an original pattern or the cumulative density frequency patterns of an original, and a curve 50 in the first quadrant I represents a color separation tone curve to be set in the scanner. The color separation tone curve 50 is obtained by connecting crossing points of lines perpendicular to the ordinate and the abscissa, respectively, from 25%, 50%, and 75% cumulative density frequency points on the second and the fourth quadrant cumulative density curves 20 and 30. Then, the deviations X, Y and Z of the original color separation tone curve 50 from the reference color separation tone curve 40 are computed by a microcomputer. These deviations X, Y and Z represent the adjustment amounts of the reference color separation tone curve of the scanner necessary for reproducing the original in the tones of the standard printed reproduction. These deviation X, Y and Z are dimensionless numbers. The scanner adjustment may be achieved by a conversion of the deviations into the rotational angle of the tone control knobs of the scanner. The conversion may be achieved by calculating and storing the rotational angle of the control knob of the scanner that corresponds to a unit length of the ordinate of the first quadrant I so that the calculated results may be used repeatedly. This calculating operation may also be achieved by a microcomputer. This process has an advantage over the first-mentioned process in that it does not require color separation tone curves of the scanner corresponding to the respective standard density distribution patterns.

Still another process for obtaining a color separation tone curve for the scanner utilizes the difference between the cumulative density frequencies of the original and the standard printed reproduction or the difference between the original pattern and the standard pattern.

Figure 9:
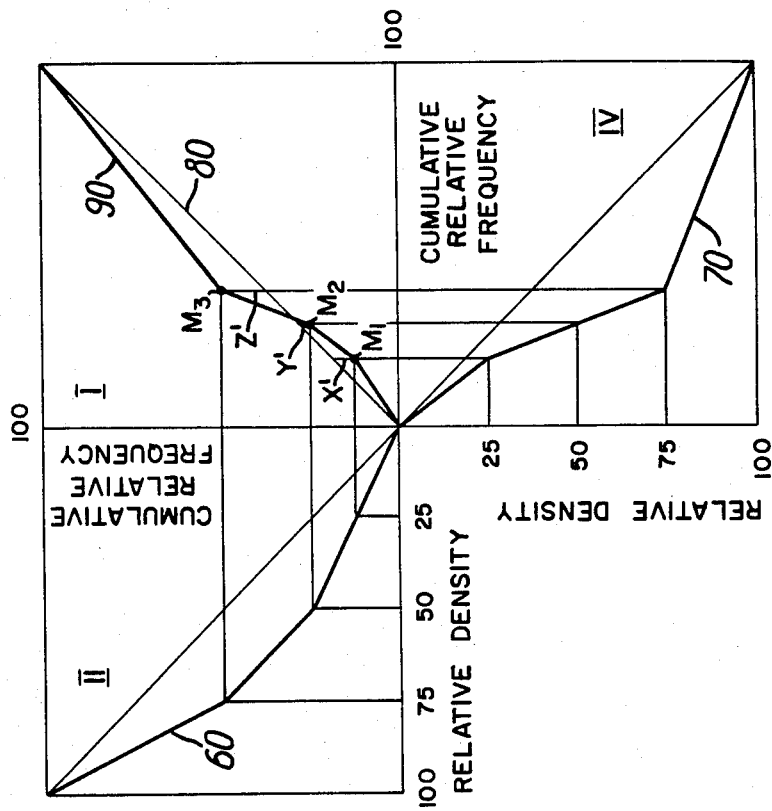
FIG. 9 is a graph for explaining the mathematical process for obtaining the correction amount of the reference color separation tone curve from the standard density distribution pattern, the original density distribution pattern and the reference color separation tone curve of the scanner.

FIG. 9 illustrates one example of the procedure for obtaining the difference between the standard density distribution pattern and the original density distribution pattern. In the Figure, a curve 60 in the second quadrant II represents the cumulative density frequency i.e., a standard pattern of a printed reproduction, a curve 70 in the fourth quadrant represents the cumulative density frequency, i.e., a density distribution pattern of the original, and a straight line 80 in the first quadrant represents the reference color separation tone curve of the scanner. The reference color separation tone curve of the scanner is treated as being a straight line to simplify the computation, although the actual reference tone curve of a scanner is typically slightly curved. The curve 90 is obtained by connecting crossing points $M_1$, $M_2$ and $M_3$ of lines perpendicular to the ordinate and the abscissa respectively of the first quadrant I extending from 25%, 50% and 75% relative density points on the original pattern 70. If the standard pattern 60 and the original pattern 70 are identical, the curve 90 becomes a straight line in registry with the reference color separation tone curve which is the straight line 80 in the first quadrant I. From this is known that, when a curve 90 is obtained because of the difference between the standard pattern 60 and the original pattern 70, the curve 90 and the reference color separation tone curve 80 are correlated. In other words, the deviations or gaps X', Y' and Z' between the points $M_1$, $M_2$ and $M_3$ on the curve 90 and the straight line 80 indicate the differences in the cumulative density frequency at each point on the standard pattern 60 and the original pattern 70 and they also indicate how the reference color separation tone curve 80 of the scanner should be modified in order that the printed reproduction of the original has the same tone or density distribution as the standard pattern. However, since the deviations X', Y' and Z' represent amount in percent of the cumulative pattern frequency, the obtained deviations X', Y' and Z' must be converted into adjustment values of the color separation tone curve. Although the conversion equation for such conversion are typically different from one type of a scanner to the next, the conversion equation once obtained can be used repeatedly. The deviations X', Y' and Z' are preferably obtained by microcomputer, and the conversion equation may preferably be stored in the computer, so that the neccessary adjustment amount for adjusting the reference color separation tone curve 80 can be immediately obtained when needed.

When an original to be reproduced by lithography is scanned and color-separated with a scanner for which a color separation tone curve has been set up by the above described process, it is possible to produce a set of color separation negatives or positives which ensure a printed reproduction that has the desired tone or density distribution.

The apparatus for use in adjusting the color separation tone curve of a scanner as shown in FIG. 1 will now be described in more detail. The density measurement unit for measuring the density of the original to be reproduced in lithography comprises an original mounting cylinder 1 for mounting thereon, the original 2, a light source 3 and a sensor in the form of a photo-electric conversion element 6. The analogue density signal produced by the density measurement unit is supplied to the CPU or microcomputer 8, wherein the density signal is subjected to various operations to obtain the density distribution, and processed to generate the density distribution "pattern", which is then stored as a "patternized" signal. The stored signal can readily be outputted. The density distribution "pattern" of the original to be reproduced and the stored "pattern" of the standard reproductions are selectively or concurrently displayed on the CRT display device 10. If desired the printer 9 may be used to print out various data stored in the microcomputer in the form of figures. The microcomputer 8 also computes and outputs the deviation or difference between various "patterns".

FIG. 2 shows one exemplary arrangement for measuring the density of the original or a reproduction. The transparency 2 is mounted on the mounting cylinder 1 so that the transparency covers the window formed in the opaque cylinder wall. The mounting cylinder 2 is driven by an electric motor (not shown) to rotate about its longitudinal axis and to move in the axial direction by a predetermined adjustable pitch for each one complete rotation. The light from the light source 3 is collected by the lens system 4 into a parallel light beam which in turn passes through an unillustrated slit to become a narrow beam. The narrow beam reflects off the mirror 5 to illuminate a small portion of the original 2 from the rear. The light is reduced according to the density of the irradiated portion of the original 2 as it passes through the original and is reflected off the total reflection mirror V''' to pass through the visual filter V' to reach the photomultiplier V, where the light ray is converted into a electric signal indicative of the density of the measured spot of the original. In this example, the original 2 and the original mounting cylinder 1 are movable while the other parts including the light source 3, the lens system 4, the mirrors 5 and V''', the filter V' and the photomultiplier V, are stationary.

When it is desirable to measure the density of the colors red, green and blue separately the total reflection mirror V'' is retracted from the light path to allow the light ray to reach the half mirrors R'', G'' and B'', whereby the densities of each color are separately measured by the photomultipliers R, G and B through the filters R', G' and B'.

An alternative method for scanning the original with a light spot includes rotating the original mounting cylinder 1 in synchronization with the translational axial movement of the light receiving parts such as the light spot and photomultipliers, and reciprocatingly moving the optical system including the light source and the light receiving unit while holding the original stationary on a plane. A reflective original may be measured by a reflective densitometer with a similar arrangement.

The continuous analogue density signal generated by the density measurement unit is converted into a discontinuous analogue signal by a pulse generator 13 and an AND gate 14 and is supplied to the input of the processing unit 81 of the microcomputer 8. The processing unit 81 includes a separator (not shown) which separates or sorts the density signals into a predetermined number of density range sections according to their amplitude. The sorted signals may be a series of pulses of the same level independent of the density of the original. These pulse signals are counted by a pulse counter (not shown) provided for each density range section to be processed in digital. The separator or the sorter may preferably be adjustable in terms of its setting points or threshold values.

The operating unit 82 receives from the data processing unit 81 a signal indicative of the number of the pulse count for each density range section, and computes the density distribution rates which indicate the percentage of the density areas that belong to the respective density range sections, or provides the cumulative density distribution by accumulating the density distribution values of each density range section in the order of the density values and provides the cumulative density distribution rate in percentage terms for each density range section as in the similar manner previously described. The relative ratio of each of the density range sections may also be obtained. In other words, the operating unit 82 "patternizes" the density distribution of the original or the reproductions.

The operating unit 82 also performs the function of providing the difference between the standard density distribution pattern and the original density distribution pattern as well as the function of providing the amount of correction of the reference color separation tone curve from the original density distribution pattern, the standard density distribution pattern and the reference color separation tone curve. Another function of the operating unit 82 is the "standardization" of the original density distribution pattern in order that the original density distribution pattern may be directly compared with the standard density distribution pattern. In the "standardizing" operation, when the density range of the original exceeds the reproduceable density range, the portion of the original that should be expressed as the brightest is determined as point H and the portion that should be expressed as the darkest is determined as point S. These points may preferably be determined by observing a digital display on the spot density display unit 12 while manually operating the density measurement device. The measured density values below the point H density or above the point S density are neglected. In order to do this, on the basis of the point H and point S density values, the set values or the threshold values of the sorter in the processing unit 81 are shifted so that the borders of the density range sections shift. Then the density range between the point H and the point S is expressed as a cumulative density distribution rate of from 0% to 100% with a relative density of from 0% to 100%. If the density range of the original is narrower than the reproduceable density range, the above shift is effected in the opposite direction.

The density distribution "patterns" thus obtained in the operating unit 82 are stored in the storing unit 83. The stored original or standard density distribution patterns can be displayed whenever neccessary on the CRT monitor of the display device 10 by a command signal from the control panel 11. The display device can display a single original pattern and a plurality of standard patterns in an overlapping relationship, so that the comparison of the patterns and the selection of the closest standard pattern can be easily and accurately achieved by the operator. The storing unit 83 also includes the function of the conversion equations for obtaining an adjustment value for adjusting the tone reproduction curve of the scanner from the deviations X', Y' and Z'.

The measured data or the data obtained by the various operations and processing may preferably be printed out by the printer 9 through the output unit 84 of the computer 8.

What we claim is:

1. A process for classifying an original for use in reproduction in lithography according to its density distribution, comprising the steps of:
   providing a plurality of standard reproductions which are each of high quality but different from each other in terms of their tone and which are useable as standards for classifying an original;
   measuring the density distributions of the plurality of standard reproductions;
   processing each of the measured density distributions to generate and store one standard density distribution pattern corresponding to each standard reproduction, each standard density distribution pattern indicating the relative frequency of density values with respect to the entire density range of the corresponding standard reproduction;
   measuring the density distribution of an original to be classified;
   generating an original density distribution pattern from the measured density distribution of the original, said original density distribution pattern indicating the relative frequency of density values with respect to the entire density range of the original; and
   comparing said original density distribution pattern with each of said standard density distribution patterns and selecting one of said standard density distribution patterns that is closest to the original density distribution pattern thereby determining that the original belongs to a class of the standard reproduction corresponding to the selected standard density distribution pattern.

2. A process as claimed in claim 1, wherein said density distributions of the standard reproduction and the original are cumulative density distributions.

3. An apparatus for use in classifying an original to be reproduced in lithography according to its density distribution, comprising:
   means for measuring the density values of an original and a plurality of standard reproductions over substantially the entire informational area thereof and generating a plurality of density signals for each of the original and standard reproductions, each of said standard reproductions being of different but good quality in terms of their tone and being useable as standards for classigying an original;
   means for storing the density signals and sorting them according to their density values into a plurality of density range sections of the entire density range of the original and the standard reproductions for each of the original and standard reproductions;
   means for counting the number of the density signals in each of said density range sections and generating a density distribution from the number count;
   means for generating a pattern of the density distribution, said density distribution pattern indicating the relative frequency of the density values with respect to the entire density range of the original and the standard reproductions;
   means for storing at least one of the density distribution patterns; and
   means for outputting at least one of the density distribution patterns stored in said storing means.

4. An apparatus as claimed in claim 3, wherein said means for counting and generating comprises means for generating cumulative density distributions.

5. A process for adjusting a color separation tone curve for an electronic color separator for reproducing in lithography a color original in a desired tone, comprising the steps of:
   selecting a plurality of standard reproductions each of which are of high quality but different from each other in terms of their tone and which are useable as standards for comparison;
   measuring the density distributions of said standard reproductions and producing corresponding cumulative density distributions of said standard reproductions;
   processing each of the cumulative density distributions to generate a standard cumulative density distribution pattern for each density distribution, said standard cumulative density distribution pattern indicating the relative cumulative frequency of density values with respect to the entire density range of each of the standard reproductions;
   obtaining and storing set values of a color separation tone curve for the electronic color separator, said values corresponding to said standard cumulative density distribution patterns;
   measuring the density of an original to be color separated and producing a cumulative density distribution of the original;
   processing the cumulative density distribution of the original to generate an original cumulative density distribution pattern, said original cumulative density distribution pattern indicating the relative cumulative frequency of density values with respect to the entire density range of the original;
   generating a standardized density distribution pattern of the original from said cumulative density distribution of the original, said standardized density distribution pattern being directly comparable with said standard cumulative density distribution patterns;

comparing said standardized original density distribution pattern with each of said standard cumulative density distribution patterns to select one of said standard cumulative density distribution patterns that is closest to the standard density distribution pattern of the original; and adjusting the color separation tone curve for the electronic color separator on the basis of the stored set values that correspond to the selected standard density distribution pattern.

6. A process as claimed in claim 5, wherein said step of comparing and selecting one of the standard cumulative density distribution patterns comprises the step of modifying said standardized original density distribution pattern according to the contents of a set of reproduction tone modification instructions.

7. A process for setting up a color separation tone curve for an electronic color separator for reproducing in lithography a color original in a desired tone, comprising the steps of:

selecting a plurality of standard reproductions each of which are of a high quality but different from each other in terms of their tone and which are useable as standards for comparison;

measuring the density distributions of said standard reproductions and producing corresponding cumulative density distributions of said standard reproductions;

processing each of the cumulative density distribution to generate a standard cumulative density distribution pattern for each of the density distributions, said standard cumulative density distribution pattern indicating a relative cumulative frequency of the density values with respect to the entire density range of each of the standard reproductions;

measuring the density of an original to be processed and producing a cumulative density distribution of the original;

processing the cumulative density distribution of the original to generate an original cumulative density distribution pattern, said original cumulative density distribution pattern indicating the relative cumulative frequency of the density values with respect to the entire density range of the original;

generating a standardized density distribution pattern of the original from said cumulative density distribution of the original, said standardized density distribution pattern being directly comparable with said standard cumulative density distribution pattern;

comparing said original standardized density distribution pattern with each of said standard cumulative density distribution patterns to select one of said standard cumulative density distribution patterns that is closest to the original standardized density distribution pattern;

adjusting a standard color separation tone curve for reproducing the original so that it has the same tone quality of the selected standard reproduction using the original standardized density distribution pattern and the selected standard density distribution pattern;

setting up a color separation tone curve of the electronic color separator into a reference color separation tone curve for a grey scale;

comparing said standard color separation tone curve with said reference color separation tone curve to determine a difference therebetween; and modifying said reference color separation tone curve according to said difference between said standard tone curve and said reference tone curve.

8. A process for adjusting a color separation tone curve for an electronic color separator for reproducing in lithography a color original in a desired tone, comprising the steps of:

selecting a plurality of standard reproductions each of which are of a high quality but different from each other in terms of their tone and which are usuable as standards for reproduction;

measuring the density distribution of said standard reproductions and producing corresponding cumulative density distributions of said standard reproductions;

processing each of the cumulative density distributions to generate a standard cumulative density distribution pattern for each of the density distributions, said standard cumulative density distribution pattern indicating a relative cumulative frequency of the density values with respect to the entire density range of each of the standard reproductions;

measuring the density of an original to be processed and producing a cumulative density distribution of the original;

processing the cumulative density distribution of the original to generate an original cumulative density distribution pattern, said original cumulative density distribution pattern indicating the relative cumulative frequency of the density values with respect to the entire density range of the original;

generating a standardized density distribution pattern pattern of the original from: said cumulative density distribution of the original, said standardized density distribution pattern being directly comparable with said standard cumulative density distribution pattern;

comparing said original standardized density distribution pattern with each of said standard cumultive density distribution patterns to select one of said standard cumulative density distribution patterns that is closest to the original standardized density distribution pattern;

comparing said selected standard density distribution pattern with said original standardized density distribution pattern to determine a difference therebetween;

adjusting a color separation tone curve of the electronic color separator into a reference color separation tone curve for reproducing a grey scale; and modifying said reference color separation tone curve according to said difference between the selected standard cumulative density distribution pattern and the original standarized density distribution pattern.

9. An apparatus for use in adjusting a color separation tone curve for an electronic color separator comprising:

means for measuring the density values of a reproduction and an original to be reproduced over substantially the entire informational area thereof and generating, a plurality of density signals for each of the original and reproduction;

means for sorting the density signals according to their density values into a plurality of density range sections that, are sectioned from, an entire density range of the original for each of the original and reproduction;

means for counting the number of the density signals in each of said density range sections and for generating a cumulative density distribution by accumulating the counted number of the density signals in said, density range sections for each of the original and reproduction;

means for, standardizing said cumulative density distribution for each of the original and reproduction;

means for generating a pattern of said standardized cumulative density distribution for each of the original and reproduction;

means for comparing the standardized cummulative density distribution pattern of the reproduction and the density distribution pattern of the original to determine a difference therebetween;

means for storing information including the original density distribution pattern and the reproduction density distribution pattern; and means for outputting the stored information.

10. An apparatus as claimed in claim 9, wherein said means for comparing the density distribution pattern of the reproduction and the density distribution pattern of the original to determine a difference therebetween comprises means for converting said difference into set values of the color separation tone curve for the electronic color separator.

11. An apparatus for use in adjusting a color separation tone curve for an electronic color separator, comprising:

means for measuring the density values of a reproduction and and original to be reproduced over substantially the entire informational area thereof and generating a plurality of density signals for each of the original and reproduction;

means for sorting the density signals according to their density values into a plurality of density range sections that are sectioned from an entire density range of the reproduction and the original;

means for counting the number of the density signals in each of said density range sections and for generating a cumulative density distribution by accumulating the counted number of the density signals in said density range sections for each of the original and reproduction;

means for standardizing said cumulative density distribution for each of the original and reproduction;

means for generating a pattern of said standarized cumulative density distribution for each of the original and reproduction;

means for determining a correction amount for a reference color separation tone curve of the electronic color separator from the density distribution pattern of the reproduction, the density distribution pattern of the original and the reference color separation tone curve of the electronic color separator;

means for storing data corresponding to the reproduction density distribution pattern and the original density distribution pattern; and means for outputting the stored data.

* * * * *